US009575730B2

(12) United States Patent
Matsubara et al.

(10) Patent No.: US 9,575,730 B2
(45) Date of Patent: Feb. 21, 2017

(54) TEMPLATE GENERATING METHOD AND TEMPLATE GENERATING APPARATUS

(71) Applicant: FUJITSU LIMITED, Kawasaki-shi, Kanagawa (JP)

(72) Inventors: Masazumi Matsubara, Machida (JP); Yukihiro Watanabe, Kawasaki (JP); Toshihiro Kodaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/609,829

(22) Filed: Jan. 30, 2015

(65) Prior Publication Data

US 2015/0143331 A1 May 21, 2015

Related U.S. Application Data

(63) Continuation of application No. PCT/JP2012/069908, filed on Aug. 3, 2012.

(51) Int. Cl.
*G06F 9/44* (2006.01)
*G06F 9/445* (2006.01)
*G06Q 10/06* (2012.01)

(52) U.S. Cl.
CPC . *G06F 8/31* (2013.01); *G06F 8/36* (2013.01); *G06F 9/44505* (2013.01); *G06Q 10/06* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 7,802,238 B2 * | 9/2010 | Clinton | G05B 23/0213 700/10 |
| 2006/0165123 A1 | 7/2006 | Jerrard-Dunne et al. | |

(Continued)

FOREIGN PATENT DOCUMENTS

| | | |
|---|---|---|
| JP | 1-96731 | 4/1989 |
| JP | 8-16368 | 1/1996 |

(Continued)

OTHER PUBLICATIONS

International Search Report mailed Sep. 11, 2012, in corresponding International Patent Application No. PCT/JP2012/069908.

(Continued)

*Primary Examiner* — Chuck Kendall
(74) *Attorney, Agent, or Firm* — Staas & Halsey LLP

(57) ABSTRACT

A non-transitory computer-readable recording medium stores a template generating program for causing a computer to execute a process. The process includes specifying common script portions and non-common script portions from a plurality of templates for each of a plurality of categories, each of the plurality of templates include scripts related to components constituting a system, the plurality of categories being grouped by similarity of kind of the components; generating a plurality of versatile scripts for the plurality of categories, respectively, each of the plurality of versatile scripts including the specified common portions and defining the non-common portions as items indicating description variants; and generating a template for a new system combining, for a component identical to a component in the existing system, the script for the identical component in the existing system and, for a new component, the versatile script of a similar category.

7 Claims, 12 Drawing Sheets

(56) References Cited

U.S. PATENT DOCUMENTS

| | | | |
|---|---|---|---|
| 2006/0206890 A1* | 9/2006 | Shenfield .................. | G06F 8/20 717/174 |
| 2007/0174814 A1* | 7/2007 | Komissarchik ........... | G06F 8/71 717/115 |
| 2008/0051921 A1 | 2/2008 | Nammatsu | |

FOREIGN PATENT DOCUMENTS

| | | |
|---|---|---|
| JP | 2000-227855 | 8/2000 |
| JP | 2008-21111 | 1/2008 |
| JP | 2011-60035 | 3/2011 |
| WO | 2006/043012 A1 | 4/2006 |

OTHER PUBLICATIONS

Written Opinion of the International Search Authority mailed Sep. 11, 2012, in corresponding International Patent Application No. PCT/JP2012/069908.

Extended European Search Report dated Jul. 1, 2015 in corresponding European Patent Application No. 12882436.4.

* cited by examiner

FIG.8

| EXISTING SYSTEM COMBINATIONS | AS COST OF CHANGING | DB COST OF CHANGING | TOTAL COST | PRIORITY |
|---|---|---|---|---|
| IAS V10.1/Symfo V9.1 | 55 | 20 | 75 | 1 |
| Tomcat V6.0/Symfo V9.0 | 75 | 15 | 90 | 2 |
| WAS V8.0/Symfo V9.1 | 75 | 20 | 95 | 3 |
| WAS V8.1/DB2 V9.7.0 | 70 | 90 | 160 | 4 |
| IAS V8.0/MySQL V5.5.2 | 50 | 115 | 165 | 5 |

TEMPLATE GENERATING METHOD AND TEMPLATE GENERATING APPARATUS

This application is a continuation application of International Application PCT/JP2012/069908, filed on Aug. 3, 2012, and designating the U.S., the entire contents of which are incorporated herein by reference.

FIELD

The present invention relates to a template generating program, a template generating method, and a template generating apparatus.

BACKGROUND

Large-scale systems represented by the cloud have been operated in recent years. In a data center, for example, systems are operated on a multitude of physical servers, or a virtual machine is operated on a physical server and systems are operated on the virtual machine. A large-scale system such as those described above is made up of a multitude of components including hardware for each server and various types of software operating on the server.

In order to efficiently operate such large-scale systems, open source software (OSS) that achieves automation of an operation control procedure for components that constitute the system has been developed. A software that achieves automation of operation control uses scripts. The software achieves the automation of the operation control procedure using templates. The template includes configuration information related to the components of a system. For example, the template includes scripts used for making various settings related to the components and for operations including starting and stopping. The "template" is called differently according to the software and may be called a "manifest", a "recipe", a "pattern", or the like. The software that achieves the automation of the operation control describes a script used for each of different operation procedures in a template that matches an applicable system and executes the corresponding script according to the situation, thereby achieving automation of the operation.

Achieving automation of the operation control procedure requires that a template that suits a combination of pieces of software to be operated on the applicable system be prepared in advance. It may, however, be difficult to prepare a template with which operation is guaranteed on the applicable system. Combinations of components that make up a system are varied. To prepare a script that allows actual system components to operate correctly is time-consuming and the resultant prepared script often does not work properly.

Known techniques aim to reduce a burden on script preparation. In one known technique, for example, the script for software included in templates used in an existing system is stored and carried over for use in preparing a new template used in a new system. In another known technique, a script is generated from a policy description and, in still another known technique, a script is generated from a configuration of a job program used in a job system (see, for example, Patent Literature 1 and Patent Literature 2).

Patent Literature 1: Japanese Laid-open Patent Publication No. 2000-227855
Patent Literature 2: Japanese Laid-open Patent Publication No. 2008-021111
Patent Literature 3: Japanese Laid-open Patent Publication No. 2011-060035

The known technique that carries over the script used in the existing system can use the stored script if the new system uses software with a version number identical to the software with the version number of the existing system. If the new system uses software different from the software of the existing system or uses the same software as the software of the existing system, but with a version number different from the version number of the software of the existing system, the script for the new system is prepared by carrying over the script for another product or another version number. A specific portion or portions of the carried-over script to be corrected is, however, unknown and there is a case in which the prepared script doesn't operate correctly.

Alternatively, the known techniques of preparing the script from the policy description and the job program configuration require that scripts compatible with the policy description and the job program, respectively, be stored in advance and There is a case in which a script compatible with the new system is not generated successfully.

SUMMARY

According to an aspect of an embodiment, a non-transitory computer-readable recording medium stores a template generating program for causing a computer to execute a process. The process includes specifying common script portions and non-common script portions from a plurality of templates for each of a plurality of categories, each of the plurality of templates include scripts related to components constituting a system, the plurality of categories being grouped by similarity of kind of the components; generating a plurality of versatile scripts for the plurality of categories, respectively, each of the plurality of versatile scripts including the specified common portions and defining the non-common portions as items indicating description variants; and generating a template for a new system combining, for a component identical to a component in the existing system, the script for the identical component in the existing system and, for a new component, the versatile script of a similar category.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating exemplary calculations of the cost of changing the script for each existing system.

DESCRIPTION OF EMBODIMENTS

The following describes template generating programs, template generating methods, and template generating apparatuses according to embodiments of the present invention in detail with reference to the accompanying drawings. The embodiments are not to be restrictive of the invention and may be combined with each other as appropriate to the extent that processing details are not contradictory to each other.

[a] First Embodiment

Figure 1:
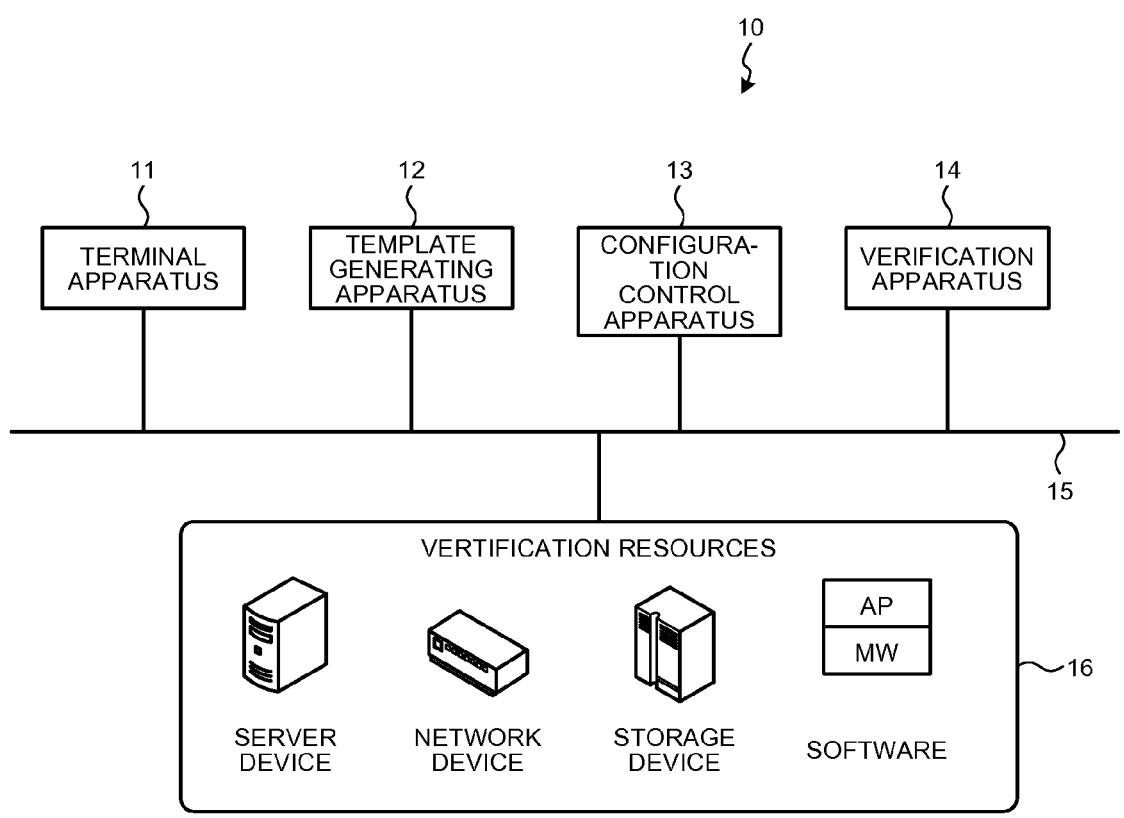
FIG. 1 is a diagram illustrating an exemplary configuration of a system according to a first embodiment.

A first embodiment will be described. The first embodiment pertains to a system 10 that generates a template suitable for automating system operation control. FIG. 1 is a diagram illustrating an exemplary configuration of the system according to the first embodiment. The system 10 of the embodiment includes a terminal apparatus 11, a template generating apparatus 12, a configuration control apparatus 13, and a verification apparatus 14. The terminal apparatus 11, the template generating apparatus 12, the configuration control apparatus 13, and the verification apparatus 14 are connected to each other via a network 15 so as to be capable of communicating with each other. In one mode, the network 15 may, for example, be a local area network (LAN), a virtual private network (VPN), or any other communication network regardless of whether they be wired or wireless.

The terminal apparatus 11 is a computer used by a user who requests generation of a new template and may, for example, be a client computer. The template generating apparatus 12 is a computer that generates templates and may, for example, be a server computer. The configuration control apparatus 13 is a computer that controls configuration control information and may, for example, be a server computer. The verification apparatus 14 is a computer that verifies templates and may, for example, be a server computer.

The configuration control apparatus 13 stores therein configuration control information of an existing system. The configuration control information includes various types of information related to execution environments in which the existing system operates. Examples of the configuration control information include hardware and an operating system (OS) and other types of software with which the existing system operates, and various types of setting information including IP addresses.

The template generating apparatus 12 enables various operations to be performed from the terminal apparatus 11 by transmitting image information of various types of operating screens to the terminal apparatus 11 to thereby cause the various types of operating screens to be displayed and by receiving, from the terminal apparatus 11, operating information that indicates a specific operation performed and various types of registered information.

For example, the template generating apparatus 12 has a plurality of pieces of software information registered from the terminal apparatus 11. The software information is related to templates that have a track record of usage in the operation control of an existing system and software that constitutes the existing system. Each of the templates includes configuration information related to components that constitute each of the existing systems. For example, the template includes scripts used for making various settings related to the components and for operation control including starting and stopping. The template also contains information on, for example, connections of software.

Exemplarily, the template generating apparatus 12 also receives, from the terminal apparatus 11, an instruction specifying a hardware, software, or other component that constitutes a new system to thereby generate a template. When instructed to generate a template, the template generating apparatus 12 generates a template used for the operation control of the new system from the templates of the existing system previously registered.

The verification apparatus 14 is capable of controlling, via the network 15, various types of resources 16 including hardware such as a server device, a network device, and a storage device and software such as an application (AP) and middleware (MW). The verification apparatus 14 is capable of building a system through the control of the various types of resources 16 and verifying the template generated by the template generating apparatus 12.

Figure 2:
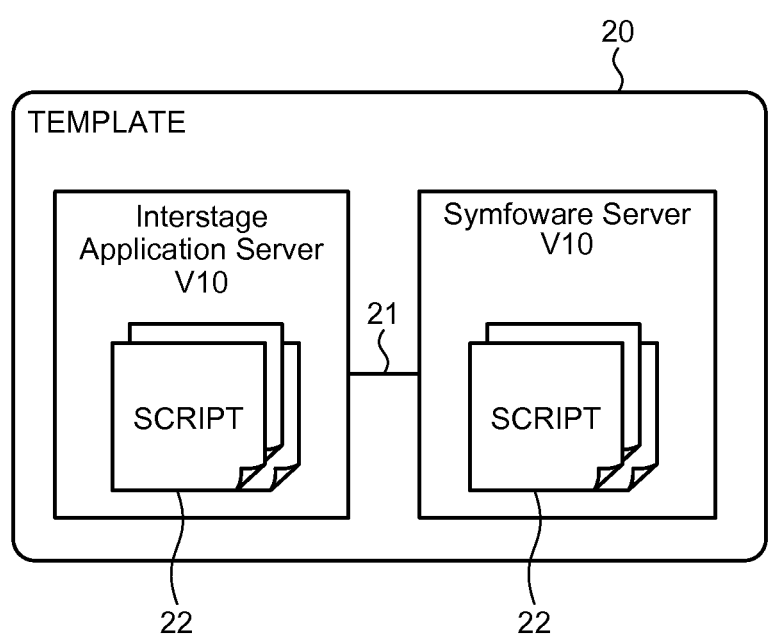
FIG. 2 is a diagram schematically illustrating an exemplary template.

FIG. 2 is a diagram schematically illustrating an exemplary template. a template 20 illustrated in FIG. 2 includes information on Interstage Application Server V10 and Symfoware Server V10 as software that constitutes the system. A link 21 indicates that the Interstage Application Server V10 and the Symfoware Server V10 are connected to each other. The template 20 includes scripts 22 used for operation control, including starting and stopping, of the Interstage Application Server V10 and the Symfoware Server V10.

Figure 3:
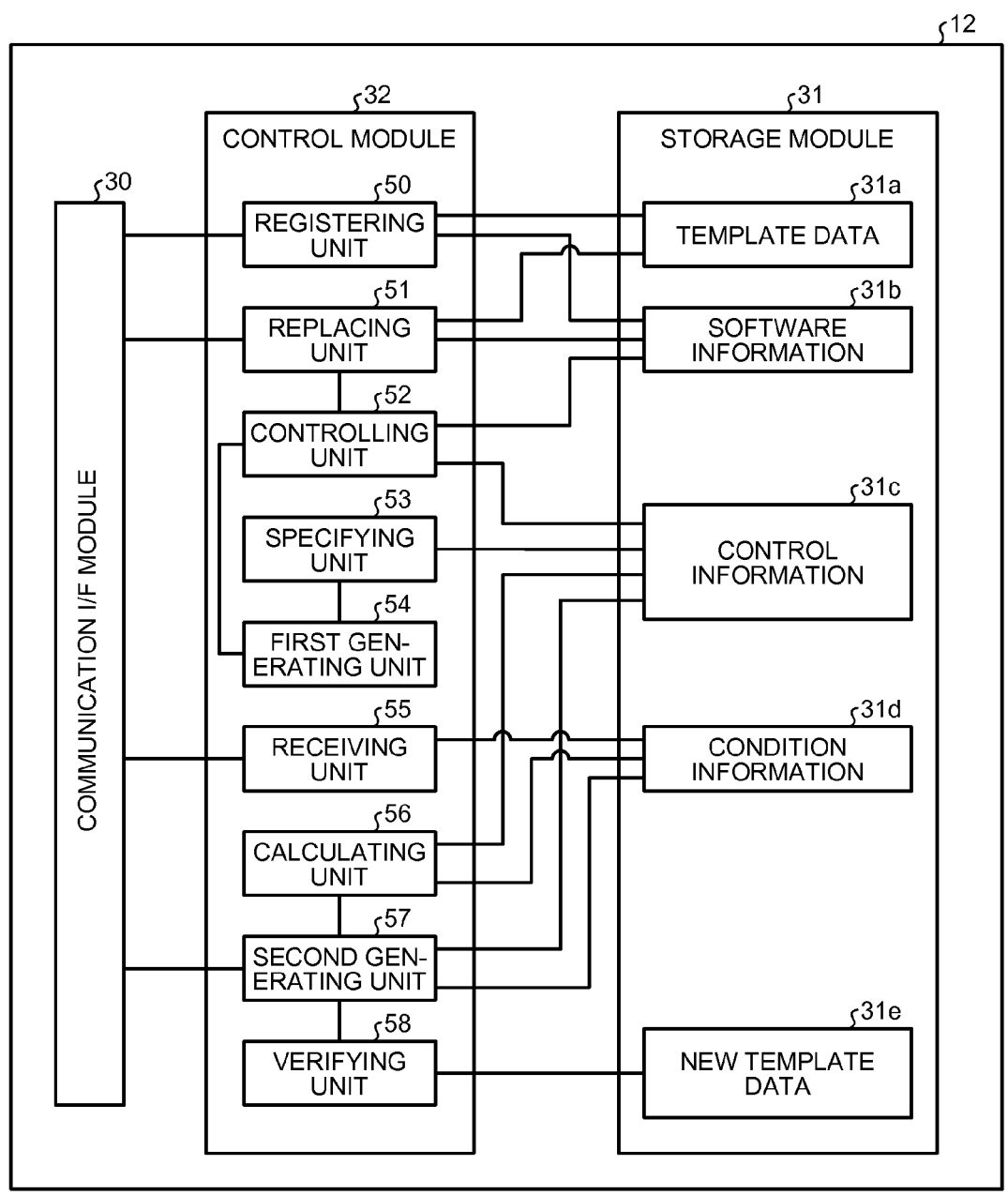
FIG. 3 is a diagram illustrating an exemplary functional configuration of a template generating apparatus.

FIG. 3 is a diagram illustrating an exemplary functional configuration of the template generating apparatus. As illustrated in FIG. 3, the template generating apparatus 12 includes a communication I/F module 30, a storage module 31, and a control module 32.

The communication a module 30 is an interface that performs communication control in communications with other apparatuses, for example, the terminal apparatus 11, the configuration control apparatus 13, and the verification apparatus 14. For example, the communication I/F module 30 receives template data and software information of the existing system registered from the terminal apparatus 11. In addition, the communication I/F module 30 receives, from the terminal apparatus 11, an instruction to generate a template to be used for the operation control of a new system, together with data related to hardware, software, and other components that constitute the new system. Additionally, the communication I/F module 30 transmits a request for referencing the configuration control information to the configuration control apparatus 13 and receives data on the requested configuration control information from the configuration control apparatus 13. Additionally, the communication I/F module 30 transmits data on the template to be verified to the verification apparatus 14 and receives a verification result from the verification apparatus 14. In one mode, the communication I/F module 30 may, for example, be a LAN card or other network interface card.

The storage module 31 is a storage device that may be a semiconductor memory device such as a flash memory, a hard disk, and an optical disk. The storage module 31 is not, however, limited to the above-cited types of storage devices and may even be a random access memory (RAM) or a read only memory (ROM).

The storage module 31 stores therein an OS and various computer programs used for the generation of the template executed by the control module 32. In addition, the storage module 31 stores therein various types of data used by the programs executed by the control module 32. For example, the storage module 31 stores therein template data 31a, software information 31b, control information 31c, condition information 31d, and new template data 31e.

The template data 31a represents the templates having a track record of usage in the operation control of the existing system. As one example of the template data 31a, a template registered through the terminal apparatus 11 and received by the communication I/F module 30 is registered by a registering unit 50 to be described later. As another example, the template data 31a is referenced by a replacing unit 51 to be described later when a versatile script is generated.

The software information 31b represents stored data indicating software-related information such as the type and the version of each piece of software that constitute the existing system. As one example of the software information 31b, software information registered through the terminal apparatus 11 and received by the communication I/F module 30 is registered by the registering unit 50 to be described later. As another example, the software information 31b is referenced by the replacing unit 51 to be described later when a versatile script is generated.

The control information 31c represents data that controls, in a tree structure, a script for each of different components and a versatile script that is a common portion of scripts generalized for components of each similar category. As one example of the control information 31c, scripts having information unique to the execution environment replaced by the replacing unit 51 to be described later and versatile scripts generated by a first generating unit 54 to be described later are registered. As another example, the control information 31c is referenced by a calculating unit 56 and a second generating unit 57 to be described later when a template for a new system is generated.

Figure 4:
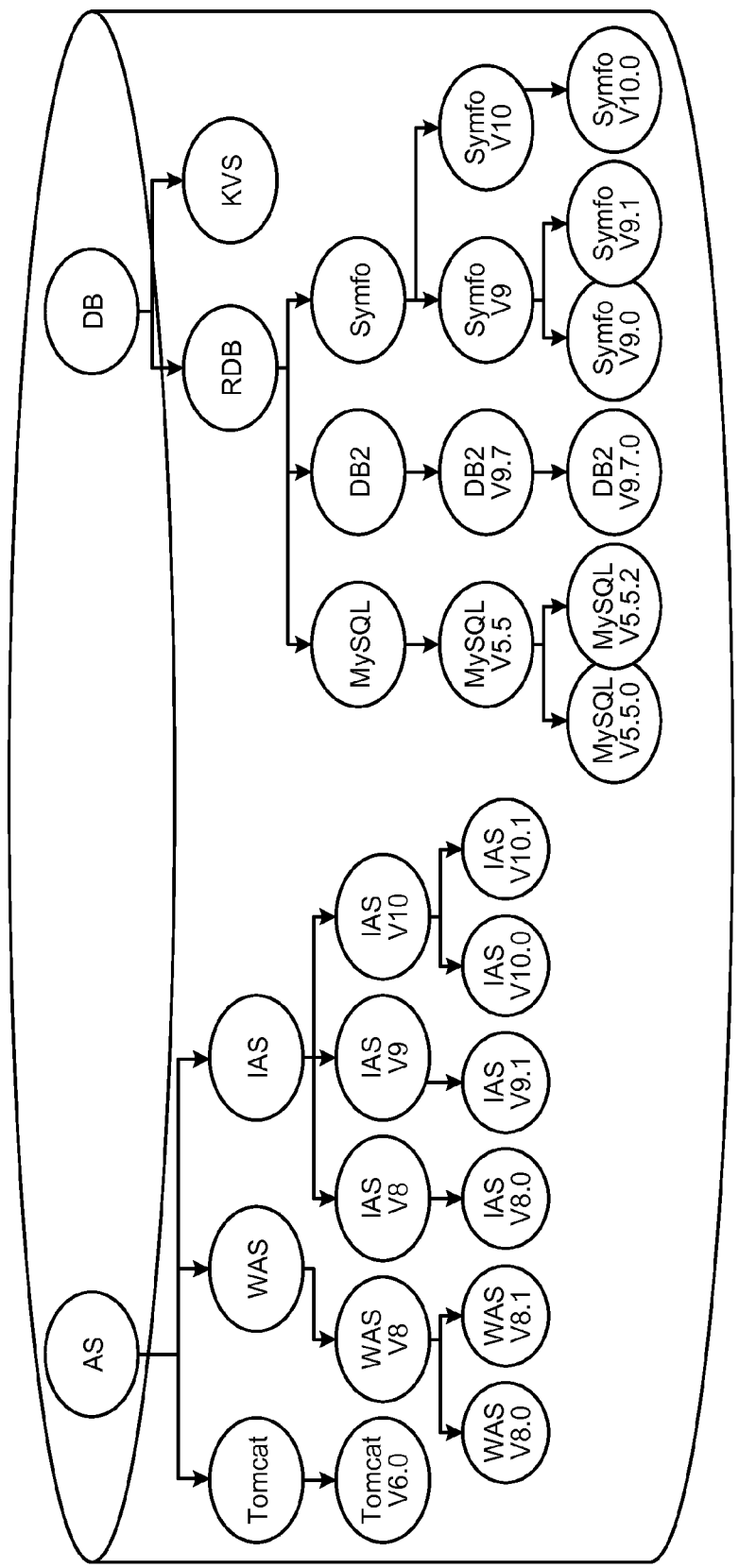
FIG. 4 is a diagram schematically illustrating a configuration of control information.

FIG. 4 is a diagram schematically illustrating a configuration of the control information. The example of FIG. 4 illustrates a case in which scripts for the software of an Application Server (AS) and a DataBase (DB) as components that constitute the system are controlled. In the control information 31c, the scripts are controlled in a hierarchical tree structure so that similar components are nodes close to each other. The control information 31c contains a script for each of node components at the lowest rank in the tree structure by associating the script with such a component. The control information 31c also contains a versatile script that is a common portion of scripts generalized of components at lower ranks. The versatile script is associated with each of node components at an intermediate portion and the highest rank in the tree structure. In the example of FIG. 4, the software of the AS and the DB is classified according to the type and the product of software, and further according to the version. The version is classified according to a major version in which major changes are made and a minor version in which minor changes are made in each major version.

For example, in the example of FIG. 4, an Apache Tomcat (Tomcat), a WebSphere Application Server (WAS), and an Interstage Application Server (IAS) are stored as the AS. In the example of FIG. 4, a Tomcat V6.0 is stored as a version of the Tomcat, a WAS V8 is stored as a version of the WAS, and an IAS V8, an IAS V9, and IAS V10 are stored as versions of the IAS. In the example of FIG. 4, a WAS V8.0 and a WAS V8.1 are stored as minor versions of the WAS V8. In the example of FIG. 4, an IAS V8.0 is stored as a minor version of the IAS V8. In the example of FIG. 4, an IAS V9.1 is stored as a minor version of the IAS V9. In the example of FIG. 4, an IAS V10.0 and an IAS V10.1 are stored as minor versions of the IAS V10.

In the example of FIG. 4, a Relational Data Base (RDB) and a Key Value Store (KVS) are stored as types of the DB. In the example of FIG. 4, a MySQL, a DB2, and a Symfoware Server (Symfoware) are stored as the RDB. In the example of FIG. 4, a MySQL V5.5 is stored as a version of the MySQL and a DB2 V9.7 is stored as a version of the DB2. In the example of FIG. 4, a Symfoware V9 and a Symfoware V10 are stored as versions of the Symfoware. In the example of FIG. 4, a MySQL V5.5.0 and a MySQL V5.5.2 are stored as minor versions of the MySQL V5.5. In the example of FIG. 4, a DB2 V9.7.0 is stored as a minor version of the DB2 V9.7. In the example of FIG. 4, a Symfoware V9.0 and a Symfoware V9.1 are stored as minor versions of the Symfoware V9. In the example of FIG. 4, a Symfoware V10.0 is stored as a minor version of the Symfoware V10.

Reference is made back to FIG. 3. The condition information 31d represents stored data indicating information related to the components that constitute the new system. As one example of the condition information 31d, information that indicates the components constituting the new system is registered by a receiving unit 55 to be described later. As another example, the condition information 31d is referenced by the calculating unit 56 and the second generating unit 57 to be described later when a template for a new system is generated.

The new template data 31e is template data generated for use in the operation control of a new system. As one example of the new template data 31e, information that indicates the components constituting the new system is registered by a verifying unit 58 to be described later.

The control module 32 has an internal memory for storing therein computer programs and control data that specify various types of processing steps. The control module 32 performs various types of processing using the programs and the control data. The control module 32 functions as a specific processor when a corresponding program operates. For example, the control module 32 includes, as illustrated in FIG. 3, the registering unit 50, the replacing unit 51, a controlling unit 52, an specifying unit 53, the first generating unit 54, the receiving unit 55, the calculating unit 56, the second generating unit 57, and the verifying unit 58.

The registering unit 50 assumes a processor that registers various types of data in the storage module 31. The registering unit 50 registers the template data 31a and the software information 31b in the storage module 31. For example, when the communication I/F module 30 receives templates and software information used in the operation control of the existing system registered at the terminal apparatus 11, the registering unit 50 registers the received templates as the template data 31a in the storage module 31. The registering unit 50 also registers the received software information as the software information 31b in the storage module 31 by associating the software information with the received templates.

The replacing unit 51 assumes a processor that replaces data. The replacing unit 51 replaces information unique to an execution environment included in the script included in each of the templates stored as the template data 31a in the storage module 31 with generalized common information. For example, for each of the templates stored as the template data 31a in the storage module 31, the replacing unit 51 reads, from the configuration control apparatus 13 via the communication I/F module 30, configuration control information that indicates a configuration of the system subject to the operation control by the template. The read configuration control information includes various types of information related to the execution environment in which the system operates. the replacing unit 51 then replaces, on the basis of the software information 31b associated with the read configuration control information and the template, the information unique to the execution environment included in the script included in the template with predetermined standard information that is correspondingly generalized. For example, the replacing unit 51 replaces the information unique to the execution environment included in the script with a predetermined character string that indicates standard information according to the type of information.

The controlling unit 52 assumes a processor that controls scripts. The controlling unit 52 controls the scripts that have been subjected to the replacement by the replacing unit 51 and generalized versatile scripts to be described later in a tree structure. For example, the controlling unit 52 extracts scripts for each piece of software from the template for which the replacing unit 51 has replaced the information unique to the execution environment with a predetermined character string. Using the software information 31b, the controlling unit 52 specifies the type and the version of the software to be processed by the extracted script. The controlling unit 52 then registers the script by associating the script with a node corresponding to the type and the version of the software specified in the control information 31c. Additionally, the controlling unit 52 registers the versatile script generated by the first generating unit 54 to be described later and description variant information by associating the versatile script and the description variant information with a high-rank node relative to a node in which a script as the basis for the versatile script in the control information 31c is registered.

The specifying unit 53 assumes a processor that specifies various things. The specifying unit 53 specifies a common portion and a non-common portion of the script registered in the control information 31c. If, for example, a script is registered in a lower-rank node with respect to each of an intermediate node and the highest-rank node in the tree structure, the specifying unit 53 specifies the common portion and the non-common portion of the scripts from the scripts of the lower-rank nodes. Assume, for example, there are scripts for software of the same type and in the same major version, but in different minor versions. The specifying unit 53 compares the scripts in the different minor versions to thereby identify the common portion and the non-common portion in the scripts. Similarly, for the versatile scripts registered in the intermediate nodes, the specifying unit 53 compares the scripts for the nodes of each similar category to thereby identify the common portion and the non-common portion in the scripts of the similar category. Assume, for example, there are versatile scripts for software of the same type and in different major versions. The specifying unit 53 compares the versatile scripts in the different major versions to thereby identify the common portion and the non-common portion in the versatile scripts. It is noted that, if there is one script for lower-rank nodes, the specifying unit 53 specifies, in the script for the lower-rank nodes, a portion that describes information classifying the lower-rank nodes as the non-common portion with the remaining portions specified as the common portion. For example, assume a case in which nodes are hierarchically classified according to the major version and the minor version and a node of the major version has only one minor version node. In this case, the specifying unit 53 specifies, in the script for the minor version node, the portion that describes the information indicating the minor version as the non-common portion with the remaining portions specified as the common portion.

The first generating unit 54 assumes a processor that generates a versatile script from the specified common portion and non-common portion. The first generating unit 54 generates a general-purpose script that describes a script for the common portions specified by the specifying unit 53 and defines the non-common portions as items indicating description variants. For example, the first generating unit 54 generates a versatile script that extracts the common portions specified by the specifying unit 53 and defines each of the non-common portions as a predetermined character string indicating a corresponding description variant. In addition, for the intermediate node and the highest-rank node, and for the components of each similar category, the first generating unit 54 generates a new versatile script that further generalizes the versatile scripts. The new versatile script extracts the common portions among the versatile scripts and defines each of the non-common portions among the versatile scripts as a predetermined character string indicating a corresponding description variant. Additionally, the first generating unit 54 generates, for each of the non-common portions, description variant information that indicates setting details of the corresponding non-common portion.

Figure 5:
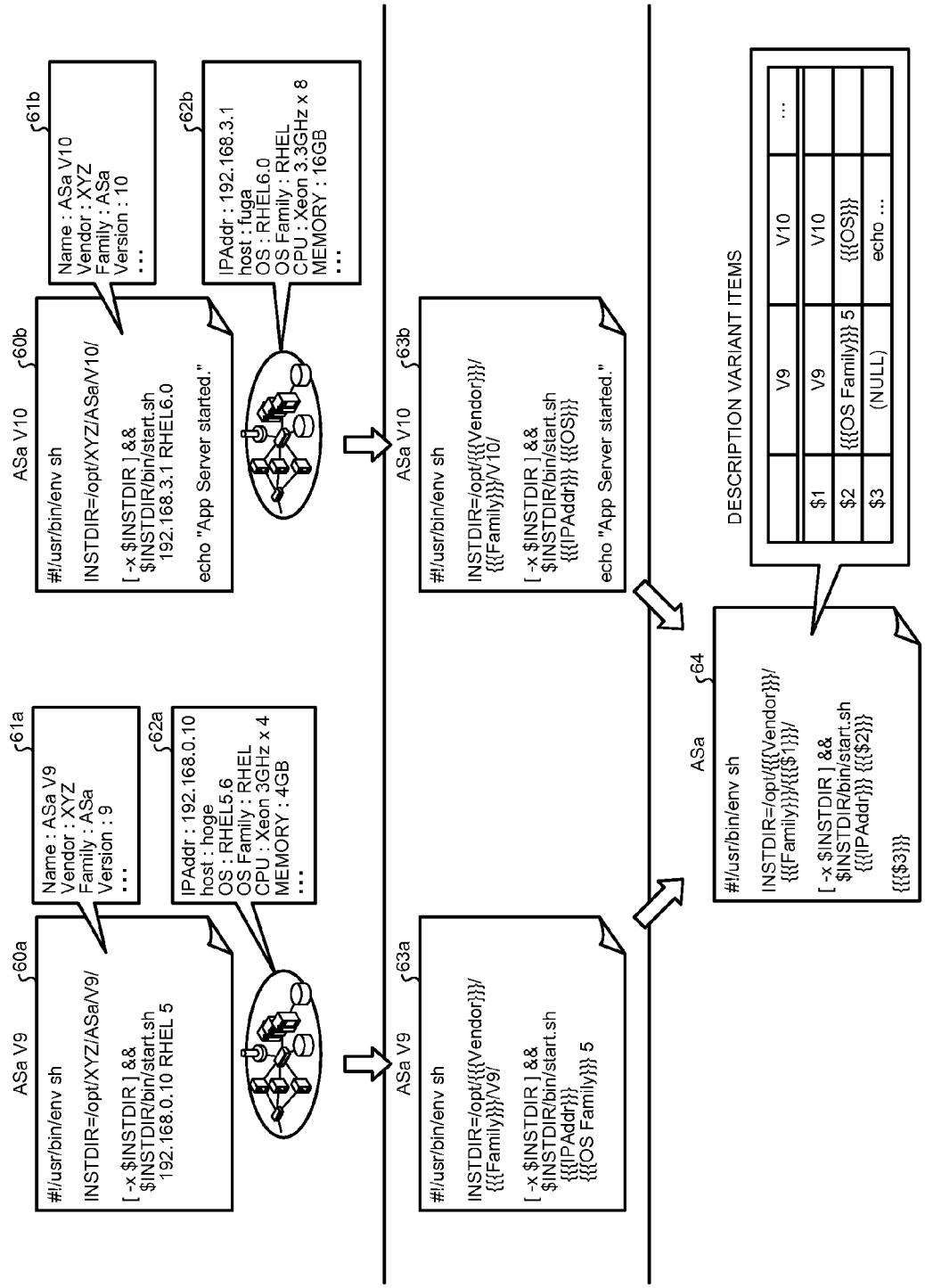
FIG. 5 is a diagram schematically illustrating an exemplary procedure for generating a versatile script from a script for an existing system.

FIG. 5 is a diagram schematically illustrating an exemplary procedure for generating a versatile script from a script for an existing system. The example of FIG. 5 illustrates two scripts 60a and 60b of two existing systems. The script 60a was used for the operation control of software "ASa V9". The script 60b was used for the operation control of software "ASa V10". The example of FIG. 5 further illustrates software information 61a and 61b and execution environment information 62a and 62b of the scripts 60a and 60b, respectively. For example, the software information 61a indicates that the software to be processed by the script 60a has the following particulars: name "ASa V9"; vendor "XYZ"; product family "ASa"; and version "9". The execution environment information 62a indicates that the script 60a has the following particulars: execution environment IP address "192.168.0.10"; host name "hoge"; OS "RHEL (Red Hat Enterprise Linux (a registered trademark)) 5.6"; OS product family "RHEL"; execution environment central processing unit (CPU) "Xeon 3 GHz×4"; and memory "4 GB".

The replacing unit 51 retrieves, from the script 60a, information unique to the execution environment stored in the software information 61a and the execution environment information 62a and replaces the information unique to the execution environment included in the script 60a with respective predetermined character strings. Additionally, the replacing unit 51 retrieves, from the script 60b, information unique to the execution environment stored in the software information 61b and the execution environment information 62b and replaces the information unique to the execution environment included in the script 60b with respective predetermined character strings. In FIG. 5, scripts 63a and 63b represent results of the replacement with the standard information. For example, the replacing unit 51 retrieves "XYZ" indicating the vendor and "ASa" indicating the product family from "INSTDIR=/opt/XYZ/ASa/V9/" described in the script 60a. The replacing unit 51 then replaces "XYZ" with "{{{Vendor}}}" and "ASa" with "{{{Family}}}". This replacement results in a changed description of the script 63a that reads "INSTDIR=/opt/{{{Vendor}}}/{{{Family}}}/V9/". The embodiment has been described for a case in which the predetermined character strings indicating the standard information are enclosed by triple curly braces { }. Any other character strings that are not duplicated with keywords used originally by the system or software, such as reserved words, may nonetheless be used.

The controlling unit 52 registers the replaced script in the control information 31c according to the type and the version of the software to be processed by the script. For example, in FIG. 5, the script 63a is registered in the control information 31c by associating the script 63a with the node of version "V9" of the software "ASa". Similarly, the script 63b in FIG. 5 is registered in the control information 31c by associating the script 63b with the node of version "V10" of the software "ASa".

The specifying unit 53 compares the script 63a with the script 63b and specifies the common portions and the non-common portions. The first generating unit 54 generates a versatile script that describes the script for the specified common portions and defines the non-common portions as items indicating description variants. The example of FIG. 5 illustrates a versatile script 64 generated through the comparison of the script 63a and the script 63b. The versatile script 64 describes the script for the common portions of the scripts 63a and 63b. The versatile script 64 further describes the non-common portions of the scripts 63a and 63b as items indicating the description variants. In the example of FIG. 5, "{{{$1}}}", "{{{$2}}}", and "{{{$3}}}" indicate the items indicating the description variants. The example of FIG. 5 further illustrates setting details of the non-common portions described in the items indicating the description variants of "{{{$1}}}", "{{{$2}}}", and "{{{$3}}}", stored as description variant information.

The controlling unit 52 registers the versatile script and the description variant information by associating the versatile script and the description variant information with a high-rank node relative to the node in which the script as the basis for the versatile script in the control information 31c is registered. For example, the controlling unit 52 registers the versatile script 64 and the description variant information of FIG. 5 by associating the versatile script 64 and the description variant information with the high-rank node relative to the nodes in which the scripts 60a and 60b are registered.

Reference is made back to FIG. 3. The receiving unit 55 assumes a processor that receives various types of instructions. The receiving unit 55 receives, from the terminal apparatus 11, an instruction to generate a template. For example, the receiving unit 55 receives, from the terminal apparatus 11, an instruction to generate a template, together with information indicating hardware, software, and other components that constitute a new system. The receiving unit 55 stores the received information indicating the components that constitute the new system as the condition information 31d in the storage module 31.

The calculating unit 56 assumes a processor that performs various calculations. If new components are included in the components that constitute the new system stored in the condition information, the calculating unit 56 calculates, with respect to each of the new components, the cost of changing the versatile script generalized from the components of the similar category in the existing system to the script for the new component.

Figure 6:
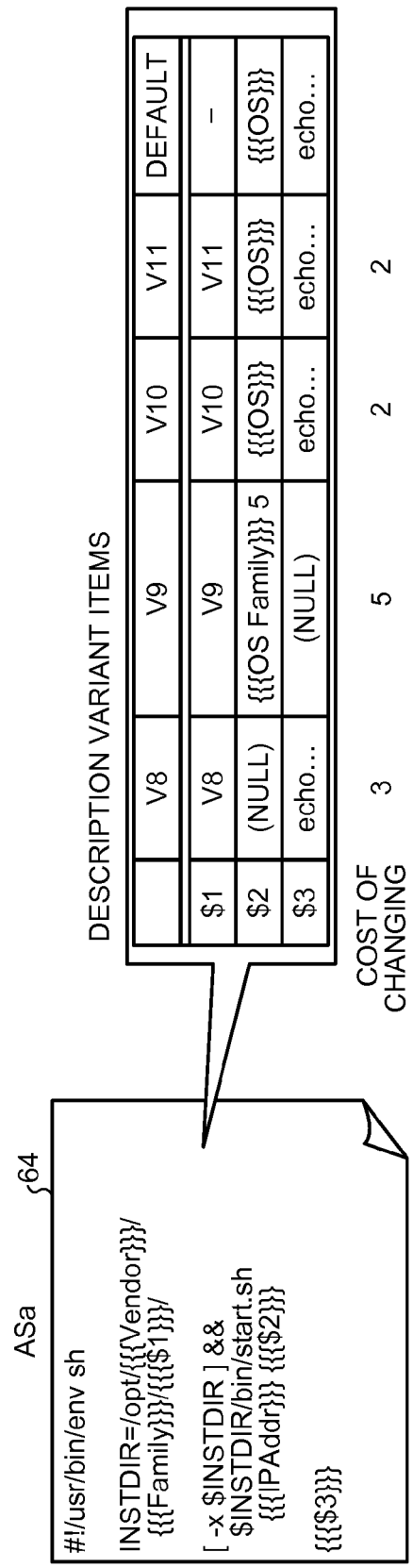
FIG. 6 is a diagram for illustrating calculations of a cost.

The following describes calculations of the cost of changing the scripts. FIG. 6 is a diagram for illustrating the calculations of the cost. FIG. 6 illustrates the versatile script 64. The versatile script 64 illustrated in FIG. 6 includes "{{{$1}}}" to "{{{$3}}}" as the items indicating the description variants. In addition, FIG. 6 illustrates exemplary setting details described in the items indicating the description variants according to the version of V8 to V11.

The calculating unit 56 specifies, with respect to the items indicating the description variants, a setting detail data item that occurs most frequently as a default. If all setting detail data items are different from each other or a plurality of setting detail data items occur most frequently, the calculating unit 56 specifies the default as being null. In the example of FIG. 6, all setting detail data items are different in the item $1 indicating the description variants, so that the default is specified as being null ("-"). For the item $2 indicating the description variants, "{{{OS}}}" that occurs most frequently is the default. For the item $3 indicating the description variants, "echo . . . " that occurs most frequently is the default.

The calculating unit 56 then calculates the cost of changing the script information. For example, the calculating unit 56 adopts the Levenshtein distance calculation method to find the cost of each of the items indicating the description variants as follows on the basis of the cost of insertion or deletion being 1 and the cost of replacement being 2.

If the setting detail is identical to the default, the calculating unit 56 determines that there is no change and sets the cost to 0.

If the default is null and the setting detail is any value other than null, the calculating unit 56 determines an insertion and sets the cost to 1.

If the default is any value other than null and the setting detail is null, the calculating unit 56 determines a deletion and sets the cost to 1.

If the default differs from the setting detail, the calculating unit 56 determines a replacement and sets the cost to 2.

If the default is null and a setting detail is set, the calculating unit 56 determines a replacement and sets the cost to 2.

In the example of FIG. 6, the calculating unit 56 calculates the cost of changing the versatile script 64 to the script for respective versions by adding the cost of changing the items indicating the description variants to setting details for respective versions. For example, to change the versatile script 64 to the script for the version V8, the default is null and a setting detail is set for the item $1 indicating the description variants, so that the cost is 2. For the item $2 indicating the description variants, the default is any value other than null and the setting detail is null, so that the cost is 1. Alternatively, for the item $3 indicating the description variants, the setting detail is identical to the default, so that the cost is 0. Thus, the cost of changing the versatile script 64 to the script for the version V8 is calculated as follows: 2+1+0=3.

For each of the versatile scripts registered in the control information 31c, the calculating unit 56 calculates the cost of changing the item indicating the description variants to the information of the script for the lower-rank node. The calculating unit 56 further calculates, for each of the existing systems, the cost of changing the script for the existing system to the script for the new system on the basis of the tree structure specified by the control information 31c. For example, for a new component not included in the existing system, the calculating unit 56 calculates the cost of changing the script for the component of the similar category included in the existing system to the versatile script for a higher-rank node closest to the new component on the basis of the tree structure specified by the control information 31c.

Figure 7:
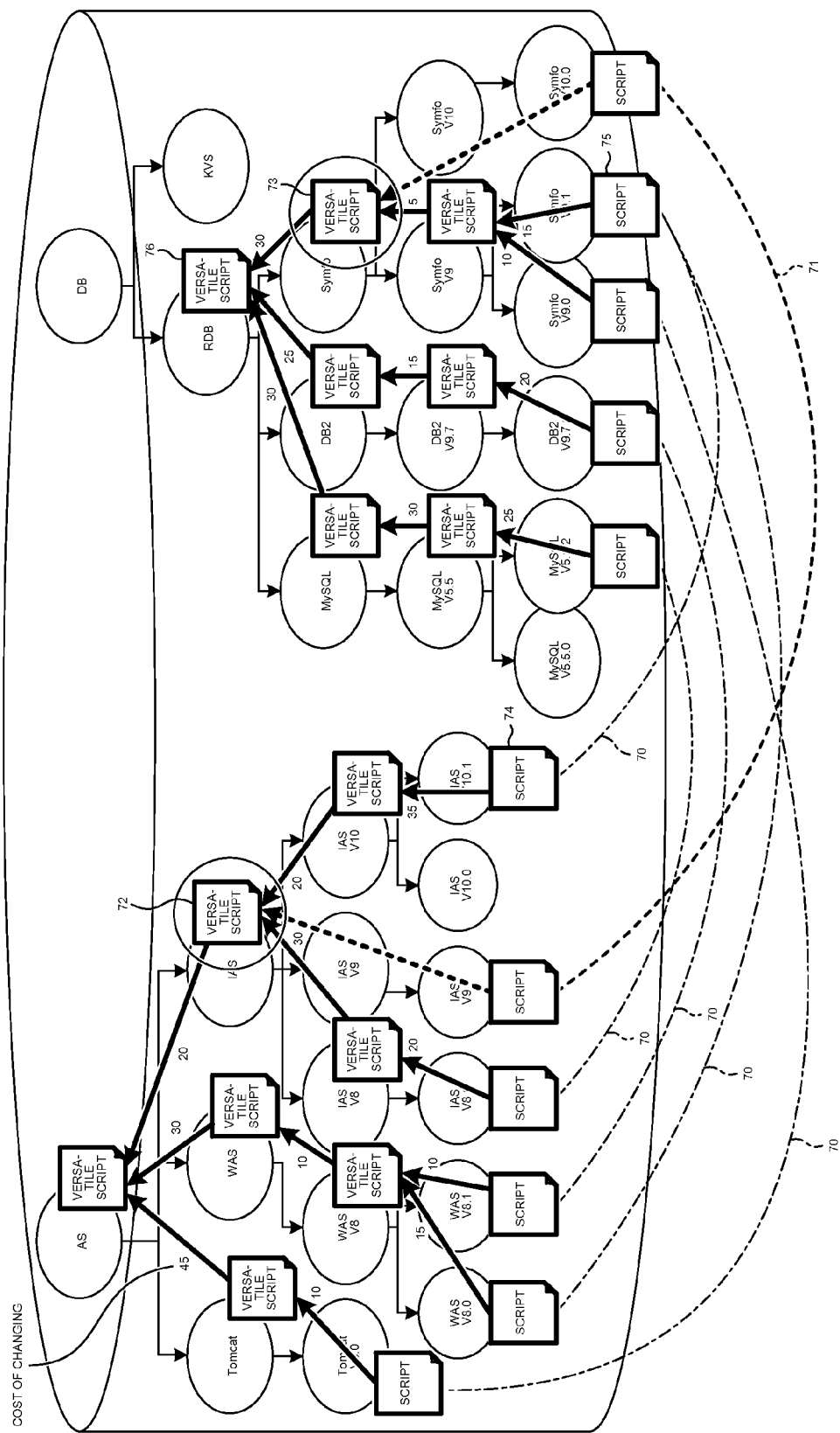
FIG. 7 is a diagram for illustrating calculations of the cost of changing the script for an existing system to a script for a new system.

FIG. 7 is a diagram for illustrating calculations of the cost of changing the script for an existing system to a script for a new system. The example of FIG. 7 indicates a numeric value that represents the cost of changing each of the versatile scripts to a script for a lower-rank node in the tree structure. In the example of FIG. 7, dash-single-dot lines 70 indicate combinations of different pieces of software that constitute the existing system. The example of FIG. 7 illustrates that one existing system has a combination of the Tomcat V6.0 and the Symfoware V9.0. The example of FIG. 7 illustrates that another existing system has a combination of the WAS V8.0 and the Symfoware V9.1. The example of FIG. 7 illustrates that still another existing system has a combination of the WAS V8.1 and the DB2 V9.7.0. The example of FIG. 7 illustrates that a further existing system has a combination of the IAS V8.0 and the MySQL V5.5.2. The example of FIG. 7 illustrates that a still further existing system has a combination of the IAS V10.1 and the Symfoware V9.1.

Assume, for example, an instruction is issued to generate a template for a new system that includes as the components thereof the IAS V9.1 and the Symfoware V10.0. In the example of FIG. 7, a broken line 71 indicates the combination of the different pieces of software that constitute the new system.

For each of the existing systems and with respect to a new component not included in the existing system, the calculating unit 56 calculates the cost of changing a script for a component of a similar category of the existing system to a higher-rank versatile script closest to the new component. In the example of FIG. 7, the calculating unit 56 calculates costs of changing the scripts for the components of a similar category of the existing system to a higher-rank versatile script 72 closest to the IAS V9.1 and to a higher-rank versatile script 73 closest to the Symfoware V10.0. For an existing system having a combination of the IAS V10.1 and the Symfoware V9.1, for example, the calculating unit 56 calculates the cost of changing a script 74 for the IAS V10.1 to the versatile script 72 as follows: 35+20=55. Similarly, the calculating unit 56 calculates the cost of changing a script 75 for the Symfoware V9.1 to the versatile script 73 as follows: 15+5=20.

FIG. 8 is a diagram illustrating exemplary calculations of the cost of changing the script for each of the existing systems. "AS cost of changing" lists costs of changing the scripts for AS software. "DB cost of changing" lists costs of changing the scripts for DB software. "Total cost" lists sum totals of the AS costs of changing and DB costs of changing. "Priority" represents priority of the existing systems in ascending order of an amount of cost. For example, for an existing having a combination of the IAS V10.1 and the Symfoware V9.1, the cost of changing the script 74 for the IAS V10.1 is "55" and the cost of changing the script 75 for the Symfoware V9.1 is "20". The total cost of changing the scripts for the existing system having the combination of the IAS V10.1 and the Symfoware V9.1 is thus calculated as "75".

Reference is made back to FIG. 3. The second generating unit 57 assumes a processor that generates a template for use in an operation control procedure for a new system. The second generating unit 57 establishes priority for the existing systems in ascending order of the calculated cost. The second generating unit 57 then changes the scripts for the existing systems in order of the priority to thereby generate templates for new systems. For example, for a component identical to a component in an existing system, the second generating unit 57 generates a template using the script for the identical component in the existing system. For any new component not included in the existing system, the second generating unit 57 generates a template using a versatile script that is generalized from the component of a similar category in the existing system and the new component. For example, for any new software, the second generating unit 57 generates a template using the versatile script for the lowest-rank node that is common to the software of the similar category in the existing system and to the new software in the tree structure specified by the control information 31c. In the tree structure illustrated in FIG. 7, for example, when the new software is the Symfoware V10.0 and the software of the similar category in the existing system is the MySQL V5.5.2, the second generating unit 57 generates a template using a versatile script 76. If the script includes a predetermined character string indicating the standard information, the second generating unit 57 replaces the character string with information unique to the execution environment of the new system to thereby generate a template.

Figure 9:
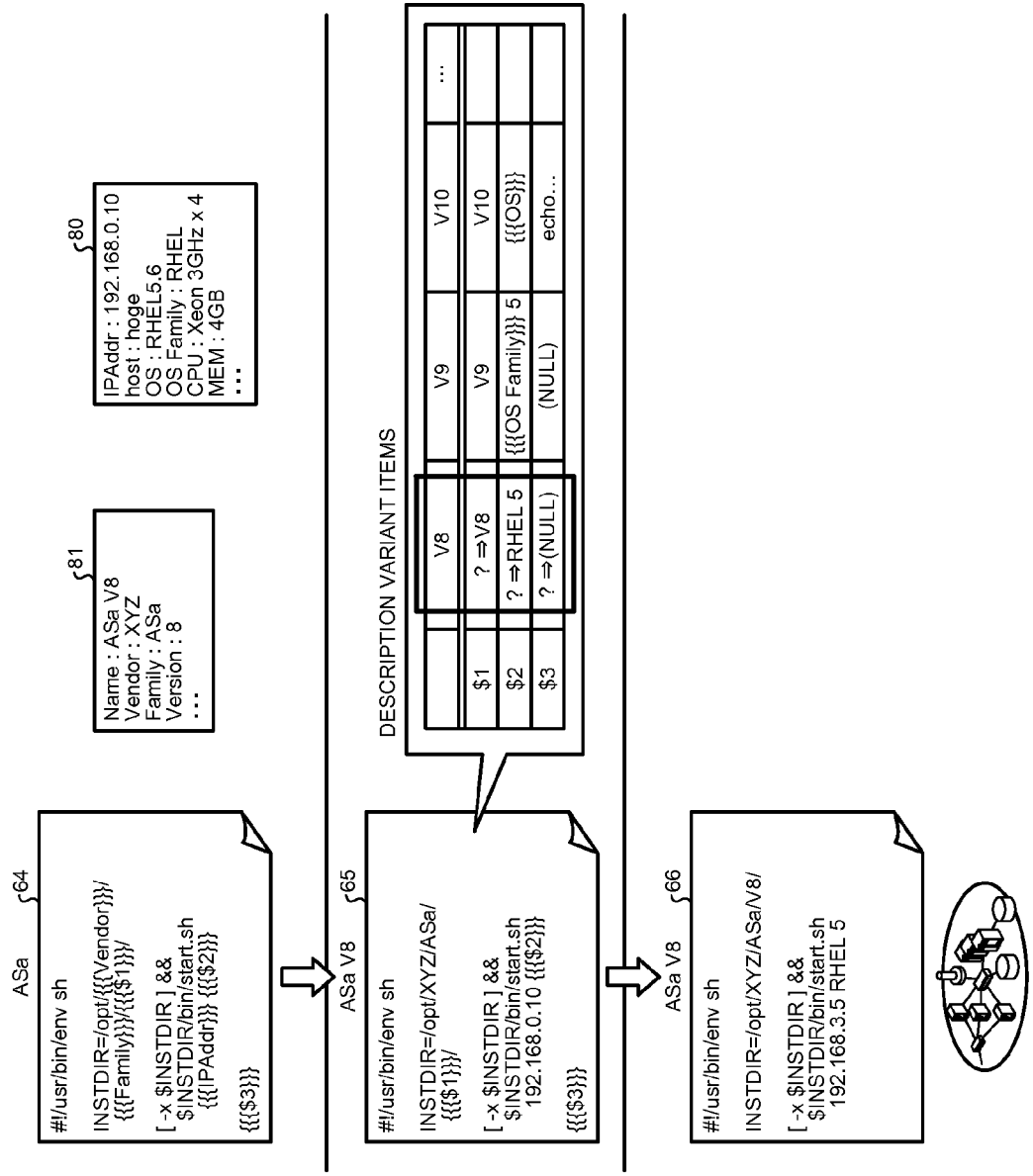
FIG. 9 is a diagram schematically illustrating an exemplary procedure for generating a script compatible with a new component from the versatile script.

FIG. 9 is a diagram schematically illustrating an exemplary procedure for generating a script compatible with a new component from the versatile script. The example of FIG. 9 illustrates the versatile script 64 generalized with respect to the software "ASa". The versatile script 64 includes character strings indicating the standard information, specifically, "{{{Vendor}}}", "{{{Family}}}", and "{{{IPAddr}}}". The versatile script 64 further includes the items indicating the description variants, specifically, "{{{$1}}}", "{{{$2}}}", and "{{{$3}}}".

On the basis of the information related to the components specified as the new system indicated by the condition information 31d, the second generating unit 57 reads, from the configuration control apparatus 13 via the communication I/F module 30, configuration control information related to the components used in the new system. The read configuration control information includes various types of information related to the execution environment in which the new system operates. FIG. 9 illustrates exemplary execution environment information 80. FIG. 9 further illustrates exemplary software "ASa" information 81. The software "ASa" is specified as the new system.

The second generating unit 57 replaces the standard information included in the versatile script with the information unique to the execution environment on the basis of the execution environment information 80 and the software "ASa" information 81. For example, the second generating unit 57 replaces each of the character strings indicating the standard information included in the script with corresponding information unique to the execution environment.

A script 65 illustrated in FIG. 9 represents results of the replacement with the information unique to the execution environment. For example, the second generating unit 57 replaces "{{{Vendor}}}" with "XYZ", "{{{Family}}}" with "ASa", and "{{{IPAddr}}}" with "192.168.0.10". This replacement results in a changed description of the script 65 that reads, for example, "INSTDIR=/opt/XYZ/ASa/{{{$1}}}/".

In addition, the second generating unit 57 replaces the items indicating the description variants included in the script with information corresponding to the software. For example, the second generating unit 57 replaces "{{{$1}}}", "{{{$2}}}", and "{{{$3}}}" included in the script 65 with the information corresponding to the software. The information corresponding to the software to be set in the items indicating the description variants may be specified by the user from the terminal apparatus 11 or set as description variant information in advance by, for example, an administrator. The information corresponding to the software may even be set through an estimation made from information on another version of the same software. For example, if the information of the items indicating the description variants of each version is the same as the version information, the version information of the new software may be set. Alternatively, the information corresponding to the software may be default information stored in the description variant information.

A script 66 illustrated in FIG. 9 represents results of the information corresponding to the software having been set in the items indicating the description variants. For example, the second generating unit 57 replaces "{{{$1}}}", "{{{$2}}}", and "{{{$3}}}" included in the script 65 with the information corresponding to the version V8. This replacement results in a changed description of the script 66 that reads, for example, "INSTDIR=/opt/XYZ/ASa/V8/".

The second generating unit 57 generates the template that describes the script 66 for the new system.

Reference is made back to FIG. 3. The verifying unit 58 assumes a processor that verifies the generated script. The verifying unit 58 verifies the generated script using the verification apparatus 14. The verifying unit 58 causes the verification apparatus 14 to execute the generated template to thereby determine whether the template operates correctly and whether a predetermined level of performance is obtained. If a problem is noted as a result of the verification made by the verifying unit 58, the second generating unit 57 generates a template from the script of the existing system having a second highest priority.

As described above, the template generating apparatus 12 can identify a specific portion in the script requiring a correction by generating a versatile script including the common portions of the script of the existing system and defines the non-common portions of the script as the items indicating description variants. The template generating apparatus 12 can thereby generate a template suitable for automating the operation control procedure even with a new system, by generating a template using the script for the existing system and the versatile script for the new component.

The scripts for the existing systems, having a track record of usage, offer high reliability. Thus, by changing the scripts for the existing systems in ascending order of the amount of cost of changing therefrom to generate a template for a new system, a template that tends to operate in a stable manner can be generated. Additionally, verifying the generated template enables generation of stably operating templates.

Figure 10:
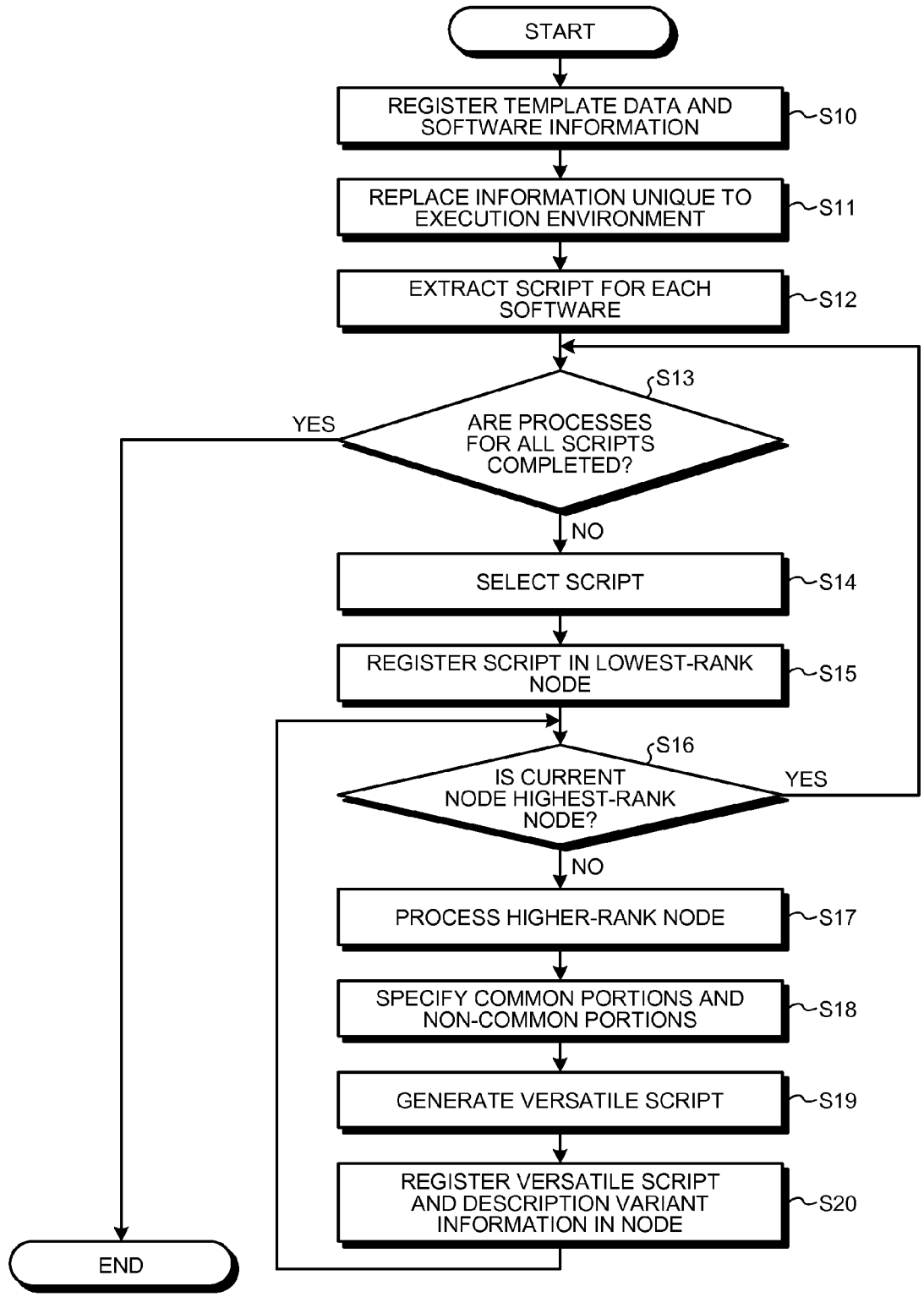
FIG. 10 is a flowchart illustrating steps for a registration process.

The following describes a registration process through which the template generating apparatus 12 according to the embodiment registers a script included in a template for an existing system in the control information 31c. FIG. 10 is a flowchart illustrating steps for the registration process. The registration process is performed when, for example, template data and software information of an existing system registered from the terminal apparatus 11 is received.

As illustrated in FIG. 10, the registering unit 50 registers the received template data and software information as the template data 31a and the software information 31b in the storage module 31 (S10). The replacing unit 51 replaces the information unique to the execution environment included in the script described in each template stored as the template data 31a in the storage module 31 with a predetermined character string indicating corresponding standard information (S11). The controlling unit 52 extracts the script for each piece of software from the replaced template (S12). The controlling unit 52 determines whether processes for all extracted scripts are completed (S13). If the processes for all scripts are completed (Yes at S13), the process is terminated.

If the processes for all scripts are yet to be completed (No at S13), the controlling unit 52 selects a script from among the scripts yet to be processed (S14). The controlling unit 52 specifies the type and the version of the software to be processed by the selected script on the basis of the software information 31b and registers the script by associating the script with the lowest-rank node corresponding to the specified type and version of the software (S15).

The controlling unit 52 determines whether the current node in which the script has been registered is the highest-rank node (S16). If the current node is the highest-rank node (Yes at S16), the above-described step of S13 is performed.

If the current node is not the highest-rank node (No at S16), the controlling unit 52 performs a process for a higher-rank node relative to the current node (S17). The specifying unit 53 specifies common portions and non-common portions in the script of the lower-rank node (S18). The first generating unit 54 generates a versatile script that describes a script for the common portions specified by the specifying unit 53 and defines the non-common portions as items indicating description variants (S19). The controlling unit 52 then registers the versatile script and, if the items indicating description variants are specified, description variant information by associating the versatile script and the description variant information with the current node for the control information 31c (S20) and performs the above-described step of S16.

Figure 11:
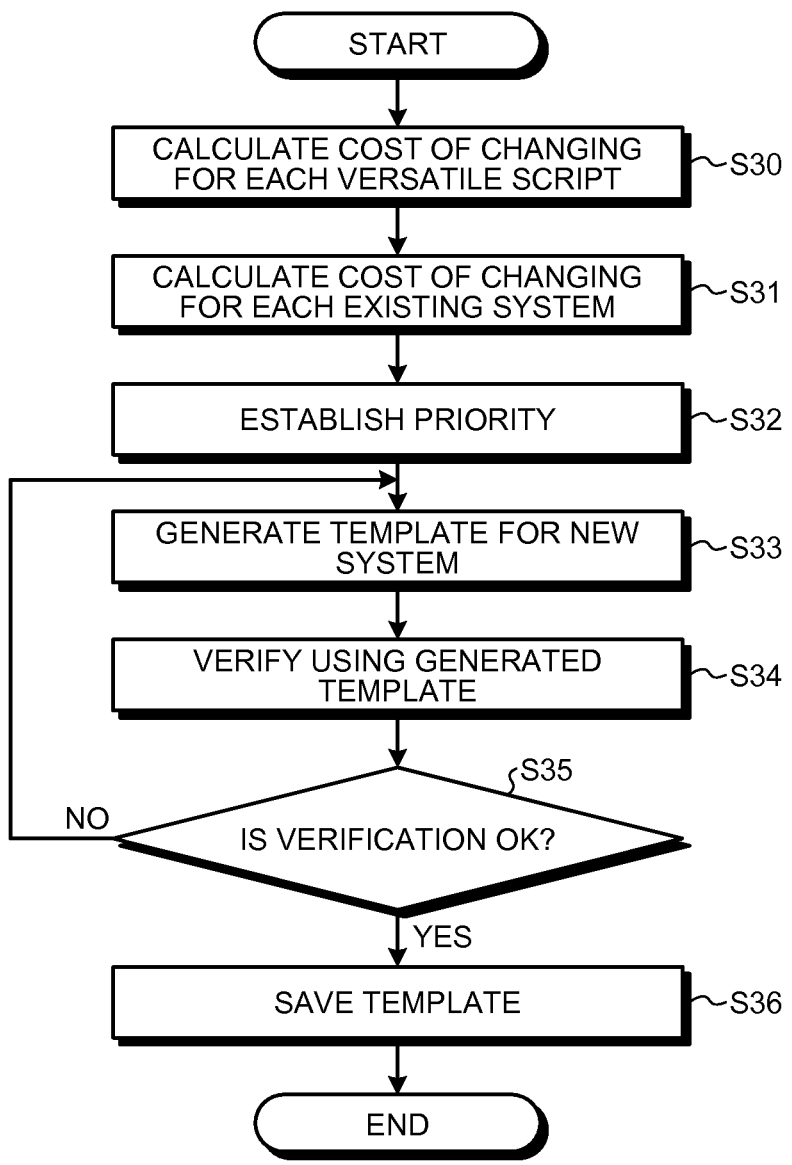
FIG. 11 is a flowchart illustrating steps for a generation process.

The following describes a generation process through which the template generating apparatus 12 according to the embodiment generates a template for a new system. FIG. 11 is a flowchart illustrating steps for the generation process. The generation process is performed when, for example, an instruction to generate a template is received from the terminal apparatus 11 together with information indicating components that constitute the new system.

As illustrated in FIG. 11, for each of the versatile scripts, the calculating unit 56 calculates the cost of changing the item indicating the description variants to the information of the lower-rank script (S30). The calculating unit 56 further calculates, for each of the existing systems, the cost of changing the script for the existing system to the script for the new system (S31).

The second generating unit 57 establishes priority for the existing systems in ascending order of the calculated cost (S32). The second generating unit 57 then changes the scripts for the existing systems in order of the priority and generates a template for the new system by replacing the standard information included in the script with information unique to the execution environment (S33).

The verifying unit 58 causes the verification apparatus 14 to execute the generated template and verifies the template operates correctly and that a generated system achieves a predetermined level of performance (S34). With a result of the verification made by the verification apparatus 14, the verifying unit 58 determines whether the script operates correctly and the generated system achieves the predetermined level of performance (S35). If the script does not operate correctly or the predetermined level of performance is not achieved (No at S35), the above-described step of S33 is performed. If the script operates correctly and the predetermined level of performance is achieved (Yes at S35), the generated template is stored in the storage module 31 (S36) and the process is terminated.

As described above, the template generating apparatus 12 specifies, from a plurality of templates that describe scripts related to each of components constituting an existing system, common portions and non-common portions of the scripts for components of each similar category. The template generating apparatus 12 generates, for the components of each similar category, a versatile script that describes the specified common portions and defines the non-common portions as items indicating description variants. The template generating apparatus 12 then generates a template for a new system using, for a component identical to a component in the existing system, the script for the identical component in the existing system and using, for a new component, the versatile script of an similar category. The template generating apparatus 12 can thereby generate a template suitable for the new system.

The template generating apparatus 12 causes the storage module 31 to store therein the control information 31c that controls, in a tree structure, a versatile script and a script for the existing system for components of each similar category. The template generating apparatus 12 calculates, for each of existing systems, the cost of changing a script for the existing system to a script for a new system on the basis of the tree structure specified by the control information 31c. The template generating apparatus 12 establishes priority for the existing systems in ascending order of the calculated cost. The template generating apparatus 12 generates a template in order of the priority using, for a component identical to a component in the existing system, the script for the component of the existing system and using, for any new component, a versatile script. The template generating apparatus 12 verifies operations performed using the generated template. The template generating apparatus 12 can thereby generate a template that operates in a stable manner.

On the basis of software information related to the software that constitutes a system and the configuration control information related to the system, the template generating apparatus 12 replaces information unique to the execution environment included in the script having a track record of usage with respective pieces of predetermined standard information. The template generating apparatus 12 then specifies common portions and non-common portions of the script for the components of each similar category from a plurality of templates, each having standard information with which the information unique to the execution environment has been replaced. The template generating apparatus 12 replaces the standard information, if included in the script, with the information unique to the execution environment of the new system, thereby generating a template. This arrangement enables the template generating apparatus 12 to generate a versatile script that allows information unique to the execution environment, even if included in the script, to be changed to information suitable for the execution environment. In addition, the template generating apparatus 12 replaces, when generating a template, the standard information included in the script with the information unique to the execution environment of the new system, so that the template generating apparatus 12 can generate a template suitable for the execution environment of the new system.

[b] Second Embodiment

While the disclosed apparatus has been described for one embodiment, the technique disclosed herein may be embodied in various other forms. The following describes another embodiment in which the present invention may be embodied.

While the above embodiment has been described for a case in which priority is established in ascending order of the cost of changing from the existing system and the templates are generated in order of the priority before being verified, the disclosed apparatus is not limited to this. For example, the template generating apparatus 12 doesn't have to verify a generated template. For example, the template generating apparatus 12 may generate a template by finding an existing system that costs less in changing and using the script for the existing system for a component identical to a component in the existing system and the versatile script for any new component. The script for the existing system, having a track record of usage, offers high reliability. The template generating apparatus 12 can thus generate a template that tends to operate in a stable manner by generating the template for a new system from the script of the existing system, which requires a lower cost of changing from the script of the existing system.

While the above embodiment has been described for a case in which a template for a new system is generated from the script of the existing system in ascending order of the cost of changing, the disclosed apparatus is not limited to this. The template generating apparatus 12 may, for example, generate the template for a new system using the script for the existing system for a component identical to a component in the existing system and using the versatile script for the closest node among others of a similar category in the tree structure for a new component. The versatile script for the closest node contains a number of common portions found in the script used for a new component. Thus, by generating a template for the new system using the versatile script for the closest node for the new component, the template generating apparatus 12 can generate a template suitable for the new system.

While the above embodiment has been described for a case in which the configuration control information that indicates the configuration of the existing system is read from the configuration control apparatus 13, the disclosed apparatus is not limited to this. The template generating apparatus 12 may instead store the configuration control information that indicates the configuration of the existing system in the storage module 31.

While the above embodiment has been described for a case in which the software information on the software that constitutes the existing system is transmitted from the terminal apparatus 11, the disclosed apparatus is not limited to this. The template generating apparatus 12 may instead read the software information on the existing system from an external device.

While the above embodiment has been described for a case in which the script that controls software is generated, the disclosed apparatus is not limited to this. The script that controls hardware can be similarly generated.

The components of each of the apparatuses illustrated in the drawings are only functionally conceptual and do not necessarily need to be configured physically as illustrated in the drawings. Specifically, a specific distributed or integrated state of each apparatus is not limited to what is illustrated in the drawings and the components of each apparatus may, in whole or in part, be functionally or physically distributed or integrated in any units depending on, for example, their load or use condition. For example, the processing portions of the registering unit 50, the replacing unit 51, the controlling unit 52, the specifying unit 53, the first generating unit 54, the receiving unit 55, the calculating unit 56, the second generating unit 57, and the verifying unit 58 illustrated in FIG. 3 may be integrated as appropriate. Additionally, each processing function performed by each of the processing portions can be achieved, in whole or in any part, by a central processing unit (CPU) and a computer program interpreted and executed by the CPU, or wired logic hardware.

Template Generating Program

Figure 12:
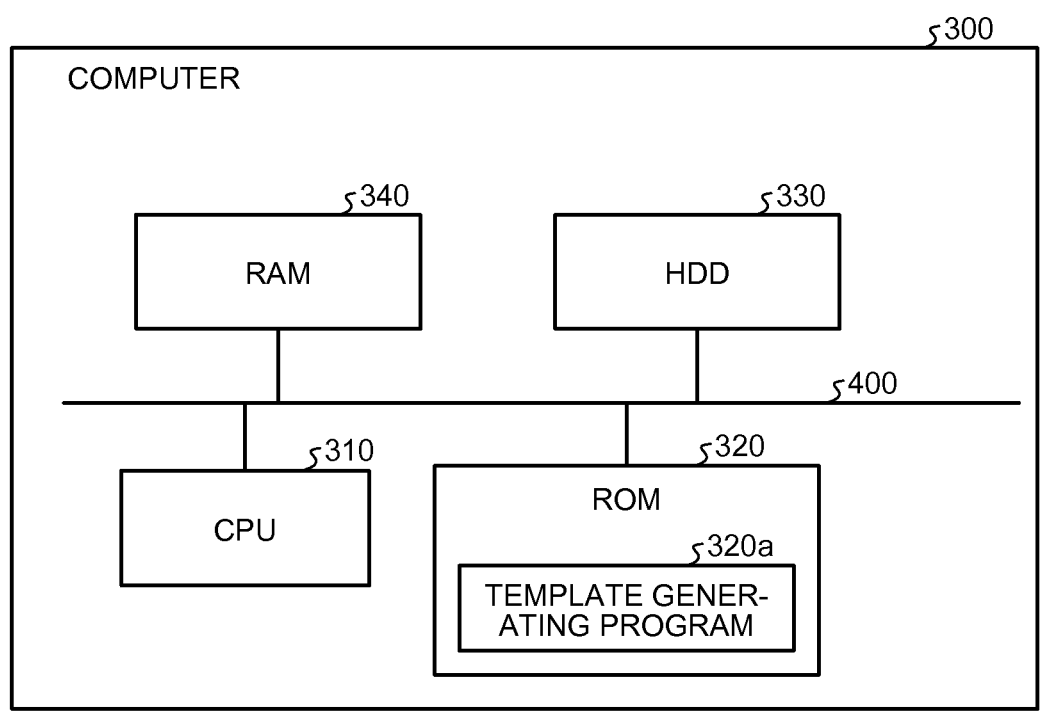
FIG. 12 is a diagram illustrating a computer that performs a template generating program.

The various types of processing described with reference to the above embodiments can also be achieved by a previously prepared program being executed on a computer system such as a personal computer and a workstation. The following describes an exemplary computer system that executes a computer program having functions identical to the functions of the above embodiments. FIG. 12 is a diagram illustrating a computer that performs a template generating program.

As illustrated in FIG. 12, a computer 300 includes a CPU 310, a read only memory (ROM) 320, a hard disk drive (HDD) 330, and a random access memory (RAM) 340. The CPU 310, the ROM 320, the HDD 330, and the RAM 340 are connected to each other via a bus 400.

The ROM 320 has a template generating program 320a stored in advance therein. The template generating program 320a exhibits a function identical to the function of each processing portion of the above embodiments. For example, the template generating program 320a is stored, which exhibits functions identical to the functions of the registering unit 50, the replacing unit 51, the controlling unit 52, the specifying unit 53, the first generating unit 54, the receiving unit 55, the calculating unit 56, the second generating unit 57, and the verifying unit 58 according to the first embodiment. The template generating program 320a may be separated as appropriate.

The HDD 330 stores therein various types of data. For example, the HDD 330 stores therein the OS and various types of data used for generating templates.

The CPU 310 reads the template generating program 320a from the ROM 320 and executes the template generating program 320a to thereby perform operations identical to the operations performed by the processing portions according to the first embodiment. Specifically, the template generating program 320a performs operations identical to the operations performed by the registering unit 50, the replacing unit 51, the controlling unit 52, the specifying unit 53, the first generating unit 54, the receiving unit 55, the calculating unit 56, the second generating unit 57, and the verifying unit 58 according to the first embodiment.

The template generating program 320a does not necessarily need to be stored in the ROM 320 in advance. The template generating program 320a may instead be stored in the HDD 330.

For example, the program may be stored in a "portable physical medium", such as a flexible disk (FD), a compact disc read only memory (CD-ROM), a digital versatile disc (DVD), a magneto-optical disk, and an IC card inserted into the computer 300, and the computer 300 may read the program therefrom and execute the program.

Alternatively, the program may be stored in, for example, "another computer (or server)" connected to the computer 300 via a public network, the Internet, a LAN, or a WAN, and the computer 300 may read the program therefrom and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a template generating program for causing a computer to execute a process comprising:

specifying common script portions and non-common script portions by comparing two templates for each of a plurality of categories, each of the two templates including scripts related to components constituting a system, the plurality of categories being grouped by similarity of kind of the components;

generating a plurality of versatile scripts for the plurality of categories, respectively, each of the plurality of versatile scripts including the specified common script portions and an item indicating a description variant in a portion corresponding to the non-common script portions; and specifying, with respect to the items indicating the description variant, a setting detail data item that occurs most frequently as a default;

generating a template for a new system combining, for a component identical to a component in the existing system, the script for the identical component in the existing system and, for a new component, the versatile script of a similar category including the specified setting detail data item as the default.

2. The non-transitory computer-readable recording medium according to claim 1, the process further comprising causing a storage module to store therein control information that controls, in a tree structure, the versatile script and the script for the existing system for components of each similar category; and calculating, for each of existing systems, a cost of changing a script for the existing system to a script for a new system on a basis of the tree structure specified by the control information, wherein the generating the template generates the template by finding an existing system estimated to cost less at the calculating and using, for a component identical to a component in the existing system, the script for the identical component in the existing system and, for any new component, the versatile script generalized from a component of a similar category in the existing system and the new component.

3. The non-transitory computer-readable recording medium according to claim 2, wherein the generating the template generates the template by establishing priority for the existing systems in ascending order of the calculated cost and, in order of the priority, using, for a component identical to a component in the existing system, the script for the identical component in the existing system and, for any new component, the versatile script generalized from a component of a similar category in the existing system and the new component, the process further comprising: verifying an operation of the generated template.

4. The non-transitory computer-readable recording medium according to claim 1, the process further comprising:

on a basis of software information relating to software that constitutes the system and configuration control information relating to the system, replacing information unique to an execution environment included in the script of the existing system with respective pieces of predetermined standard information, wherein the first specifying specifies common script portions and non-common script portions of the script for the components of each similar category from a plurality of templates, each of the templates having the standard information with which the information unique to the execution environment has been replaced, and the generating the template replaces the standard information, when included in the script, with the information unique to the execution environment of the new system to thereby generate a template.

5. A template generating method comprising:

specifying, using a processor, common script portions and non-common script portions by comparing two templates for each of a plurality of categories, each of the two templates including scripts related to components constituting a system, the plurality of categories being grouped by similarity of kind of the components;

generating, using a processor, a plurality of versatile scripts for the plurality of categories, respectively, each of the plurality of versatile scripts including the specified common script portions and an item indicating a description variant in a portion corresponding to the non-common script portions; and specifying, with respect to the items indicating the description variant, a setting detail data item that occurs most frequently as a default;

generating, using a processor, a template for a new system combining, for a component identical to a component in the existing system, the script for the identical component in the existing system and, for a new component, the versatile script of an similar category including the specified setting detail data item as the default.

6. A template generating apparatus comprising:

a processor that executes a process comprising:

specifying common script portions and non-common script portions by comparing two templates for each of a plurality of categories, each of the two templates including scripts related to components constituting a system, the plurality of categories being grouped by similarity of kind of the components;

generating a plurality of versatile scripts for the plurality of categories, respectively, each of the plurality of versatile scripts including the specified common script portions and an item indicating a description variant in a portion corresponding to the non-common script portions; and specifying, with respect to the items indicating the description variant, a setting detail data item that occurs most frequently as a default;

generating a template for a new system combining, for a component identical to a component in the existing system, the script for the identical component in the existing system and, for a new component, the versatile script of a similar category including the specified setting detail data item as the default.

7. The non-transitory computer-readable recording medium according to claim 1, wherein the specifying, with respect to the items indicating the description variant, a setting detail data item that occurs most frequently as a default specifies the default as being null, when all setting detail data items are different from each other or a plurality of setting detail data items occur most frequently.

* * * * *